US012783937B2

(12) United States Patent
Mahmood et al.

(10) Patent No.: US 12,783,937 B2
(45) Date of Patent: Nov. 3, 2026

(54) OPTIMIZED ACTIVE LEARNING USING INTEGER PROGRAMMING

(71) Applicant: NVIDIA Corporation, Santa Clara, CA (US)

(72) Inventors: Rafid Reza Mahmood, Mississauga (CA); Sanja Fidler, Toronto (CA); Marc Law, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 1250 days.

(21) Appl. No.: 17/591,039

(22) Filed: Feb. 2, 2022

(65) Prior Publication Data

US 2023/0244985 A1 Aug. 3, 2023

(51) Int. Cl.
*G06N 20/00* (2019.01)

(52) U.S. Cl.
CPC .................................... *G06N 20/00* (2019.01)

(58) Field of Classification Search
CPC ........... G06N 20/00; G06N 3/08; G06N 3/091
See application file for complete search history.

(56) References Cited

PUBLICATIONS

Benders, Jacques F., Partitioning Procedures for Solving Mixed-Variables Programming Problems, Dec. 1962, Numerische Mathematik, vol. 4, pp. 238, 244, 250 (Year: 1962).*

Van Ackooij, Wim et al., Inexact Stabilized Benders Decomposition Approaches with Application to Chance-Constrained Problems with Finite Support, May 26, 2016, Computational Optimization and Applications, vol. 65, p. 651 (Year: 2016).*

Ji, Ran and Miguel A. Lejeune, Data Driven Distributionally Robust Chance Constrained Optimization, Nov. 17, 2020, Journal of Global Optimization, vol. 79, pp. 7, 10 (Year: 2020).*

Claici, Sebastian et al., Wasserstein Measure Coresets, Mar. 2, 2020, arXiv, pp. 1, 3 (Year: 2020).*

Matlab, intlinprog—Mixed-integer linear programming (MILP), Aug. 8, 2021, pp. 2, 12 (Year: 2021).*

Kwak, Beong-woo et al., TrustAL: Trustworthy Active Learning using Knowledge Distillation, Jan. 26, 2022, Proceedings of the AAAI Conference on Artificial Intelligence, vol. 36, issue 7, pp. 2, 6, 10 (Year: 2022).*

(Continued)

*Primary Examiner* — Barbara M Level
(74) *Attorney, Agent, or Firm* — Freestone Intellectual Property Law PLLC

(57) ABSTRACT

In various examples, a representative subset of data points are queried or selected using integer programming to minimize the Wasserstein distance between the selected data points and the data set from which they were selected. A Generalized Benders Decomposition (GBD) may be used to decompose and iteratively solve the minimization problem, providing a globally optimal solution (an identified subset of data points that match the distribution of their data set) within a threshold tolerance. Data selection may be accelerated by applying one or more constraints while iterating, such as optimality cuts that leverage properties of the Wasserstein distance and/or pruning constraints that reduce the search space of candidate data points. In an active learning implementation, a representative subset of unlabeled data points may be selected using GBD, labeled, and used to train machine learning model(s) over one or more cycles of active learning.

18 Claims, 8 Drawing Sheets

(56) References Cited

PUBLICATIONS

Gal, Y., et al., "Deep Bayesian Active Learning with Image Data", International Conference on Machine Learning, PMLR, pp. 1-10 (2017).
Mahmood, R., et al., "Low Budget Active Learning via Wasserstein Distance: An Integer Programming Approach", arXiv:2106.02968v1, pp. 1-25 (Jun. 5, 2021).
Sener, O., and Savarese, S., "Active Learning for Convolutional Neural Networks: A Core-Set Approach", International Conference on Learning Representations (ICLR), arXiv:1708.00489v4 [stat.ML], pp. 1-13 (2018).
Settles, B., "Active Learning Literature Survey", Retrived from Internet URL: http://pages.cs.wisc.edu/~bsettles/active-learning/, pp. 1-47 (2009).
Shen, Y., et al., "Deep Active Learning for Named Entity Recognition", International Conference on Learning Representations (ICLR), arXiv:1707.05928v3 [cs.CL], pp. 1-15 (2018).
Shui, C., et al., "Deep Active Learning: Unified and Principled Method for Query and Training", International Conference on Artificial Intelligence and Statistics (AISTATS), PMLR, vol. 108, pp. 1-10 (2020).

* cited by examiner

600

OPTIMIZED ACTIVE LEARNING USING INTEGER PROGRAMMING

BACKGROUND

Although deep learning has the potential to achieve substantial accuracy on supervised learning tasks, most deep learning methods require massive data sets that are computationally expensive and often impractical to label and use for training. To address this challenge, active learning uses a finite budget to query and label a small subset of an unlabeled data set (e.g., an image pool) for downstream supervised learning. By iteratively labeling new points and training a machine learning model on labeled subsets of a large data set, active learning yields models that use a fraction of the data to achieve nearly the same accuracy as models trained using unlimited labeling budgets.

Optimally selecting which points to label can reduce computational and other operational costs, especially in applications such as medical imaging where labeling requires time-consuming human expert labor, or domain adaptation where data pools are hard to obtain. The task of selecting an optimal set of points to label may be thought of as an integer (or combinatorial) optimization problem that seeks to determine the most representative subset of the unlabeled data using a finite budget. However, integer optimization models often grow quickly with the data set size, making them impractical and difficult (or even impossible) to solve for the large data sets that are prevalent in deep learning. Consequently, the majority of existing approaches to active learning with neural networks replaces the optimization problem with an approximation that uses simple heuristics to estimate the value of each data point (e.g., using an adversarial model) and select points based on those estimations. However, these heuristics attempt to approximate a globally optimal solution by making locally optimal (Greedy) decisions. As a result, conventional techniques do not always arrive at the globally optimal solution (selecting the most representative subset of data for labeling). Furthermore, there are always edge cases, so conventional techniques that employ heuristics may select data poorly, and training using poorly selected data produces less accurate models while using more computational resources. Accordingly, most conventional approaches select data sub-optimally, cannot provide any guarantee on the quality of selected data (e.g., queried images), and tend to train models sub-optimally.

For example, one prior technique formulates data selection for active learning as the optimal solution to a k-center facility location problem. Facility location poses a large mixed-integer linear programming (MILP) problem, which this prior technique replaces with a greedy approximation in order to select points, thereby leading to sub-optimal solutions. This sub-optimality can incur significant opportunity cost in settings like active learning where it is preferable that every point is carefully selected to avoid wasting a limited budget.

Another prior technique is Wasserstein Adversarial Active Learning (WAAL), which proposes a probabilistic Wasserstein distance core set bound for use in data selection for active learning. However, their bound requires a Probabilistic-Lipschitz assumption on the data distribution of the subject data set, which often is not the case for the data sets that are actually available, so their guarantee (or bound)—that selecting points that minimize the Wasserstein distance will identify training data that will best improve a model—may not hold. Furthermore, to select points, this prior technique uses a semi-supervised adversarial regularizer to estimate the Wasserstein distance and a greedy heuristic to select points that minimize the regularizer. Since this prior technique approximates optimization using greedy estimation, it also often leads to sub-optimal solutions.

As such, there is a need for improved data selection techniques for active learning and other applications.

SUMMARY

Embodiments of the present disclosure relate to querying data using integer programming. More specifically, systems and methods are disclosed in which data points are selected or queried from a data set using integer programming to minimize the Wasserstein distance between the data set and the selected subset, for use in active learning, scenario reduction for stochastic optimization, and/or other applications.

In contrast to conventional systems, such as those described above, a core, optimal, substantially optimal, or otherwise representative set of example data points may be queried or selected from a data set using integer programming to directly minimize the Wasserstein distance between the data set and the core set of example data points. Unlike prior techniques that seek to approximate the optimization problem, a Generalized Benders Decomposition (GBD) algorithm may be used to decompose and iteratively solve the minimization problem. Using GBD to minimize Wasserstein distance directly solves the global optimization problem, and therefore may guarantee convergence to a globally optimal solution (an identified subset of data points that match the distribution of their data set) within a threshold tolerance. In other words, data selection using GBD to minimize Wasserstein distance may be used to select the objectively best (e.g., optimal, most representative) subset of data. In some embodiments, data selection may be accelerated by applying one or more constraints while iterating, such as optimality cuts that apply properties of the Wasserstein distance and/or pruning constraints that reduce the search space of candidate data points.

In an example implementation involving active learning with a low labeling budget, a representative subset of unlabeled data points may be queried or sampled from a data set using GBD to decompose and iteratively minimize Wasserstein distance, and the selected data points may be labeled and used to train a machine learning model(s). The process may be repeated over any number of cycles of active learning. Using GBD to minimize Wasserstein distance may serve to select training data that maximizes the impact of downstream supervised learning, producing more accurate models, and/or producing competitively accurate models more efficiently, than prior techniques.

BRIEF DESCRIPTION OF THE DRAWINGS

The present systems and methods for querying data for active learning using integer programming are described in detail below with reference to the attached drawing figures, wherein.

DETAILED DESCRIPTION

Figure 1:
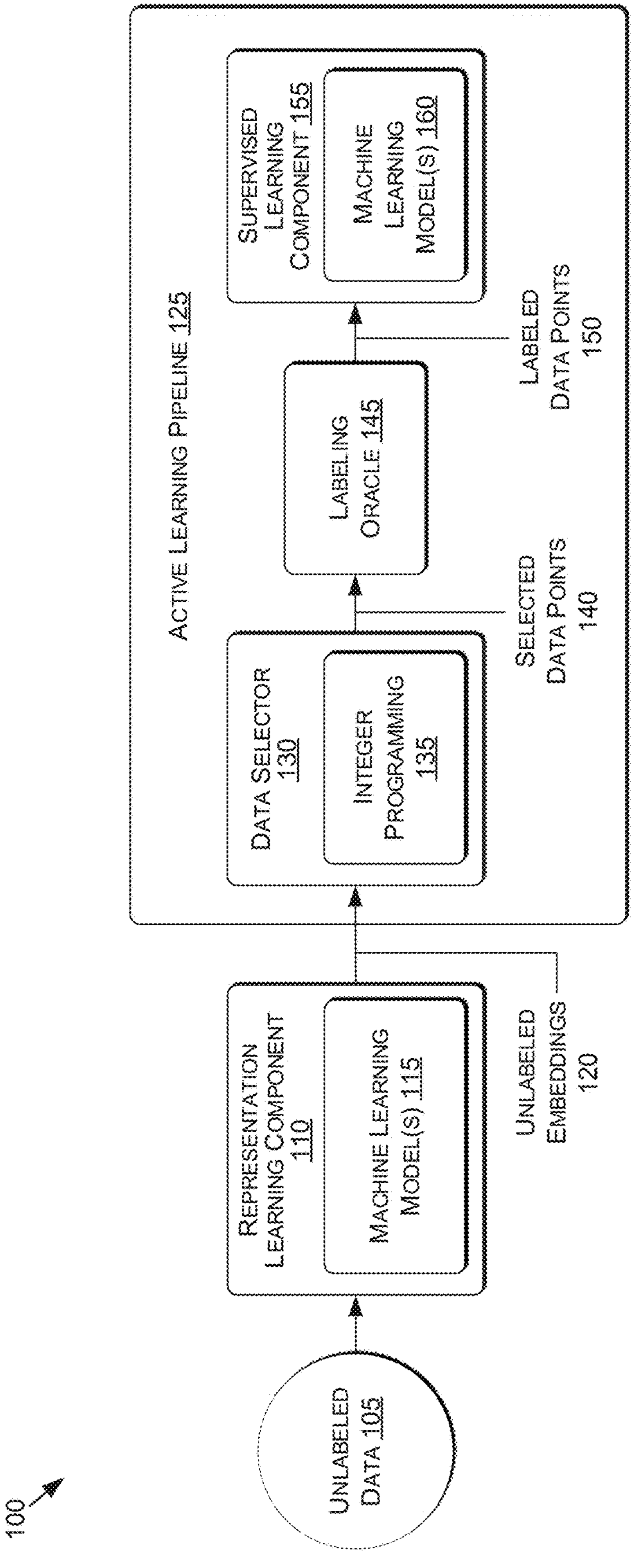
FIG. 1 is a diagram illustrating an example data flow through an example active learning system, in accordance with some embodiments of the present disclosure.

Systems and methods relating to data selection or querying using integer programming are disclosed. For example, the present disclosure describes systems and methods of data selection using integer programming to minimize the Wasserstein distance between a data set and a selected subset for use in active learning, scenario reduction for stochastic optimization, and/or other applications.

In an example implementation involving active learning with a low labeling budget, a core, optimal, substantially optimal, or otherwise representative set of example data may be queried or sampled from an unlabeled data set, labeled, and used to train a machine learning model(s), such as a deep neural network(s) (DNN(s)), during one or more cycles of active learning. Generally, a core set of data (e.g., images or image embeddings) may be selected to minimize the Wasserstein distance between the core set of data and the raw unlabeled data set. Selecting a core set of data that minimizes this Wasserstein distance may be formulated as a mixed-integer linear program (MILP) (an optimization problem), and the MILP may be solved using a Generalized Benders Decomposition (GBD). The GBD may decompose, break down, divide, or otherwise translate the optimization problem into constituent (equivalent) sub-problems (a primal problem and a relaxed master problem) that are orders of magnitude smaller, and iteratively solve the sub-problems (e.g., until their solutions converge within a threshold tolerance, until a designed limit on runtime expires). Unlike prior techniques that seek to approximate the optimization problem, using GBD to minimize Wasserstein distance directly solves the global optimization problem, and therefore may guarantee convergence to a globally optimal solution within a threshold tolerance. In other words, data selection using GBD to minimize Wasserstein distance may be used to select the objectively best (e.g., optimal, most representative) subset of data. As a result, using GBD to minimize Wasserstein distance serves to select the best training data that maximizes the impact of downstream supervised learning, producing more accurate models, and/or producing competitively accurate models more efficiently, than prior techniques.

In some embodiments, data selection may be accelerated by applying one or more constraints while iterating the (sub-problems of the) MILP. More specifically, one or more optimality cuts that apply properties of the Wasserstein distance may be imposed to reduce the set of feasible solutions, thereby reducing the search space of candidate data points and the number of iterations required until convergence. Additionally or alternatively, one or more pruning constraints may be applied to remove search neighborhoods around core sets with high Wasserstein distances and to encourage searching near neighborhoods around core sets with lower Wasserstein distances. As such, applying one or more of these constraints may optimize and accelerate the data selection process, thereby speeding up active learning (or other applications).

In some embodiments, to facilitate data selection, each instance of data in a data set (e.g., each image in an image pool) is first encoded into a corresponding latent representation (e.g., a vector embedding). Generally, any representation learning technique may be applied. In some embodiments, self-supervised learning is used to pre-train a machine learning model(s) to extract representations of the data. In some cases, self-supervised pre-training accelerates active learning to competitive accuracies while using orders of magnitude less labeled data than other techniques.

The present techniques result in a variety of advances and benefits over prior data selection techniques. To our knowledge, the present technique is the first integer programming technique capable of determining an optimal core set of data (e.g., images) that matches the distribution of the (unlabeled) data set (e.g., the raw image pool) from which it was sampled. Whereas prior techniques use greedy heuristics and/or customized (e.g., semi-supervised adversarial learning) losses to learn a specific feature space in which to select points, various embodiments instead treat data selection as a distribution matching problem and solve that problem using a mixed-integer optimization formulation that minimizes the discrete Wasserstein distance between the selected data and its constituent (unlabeled) data set. Furthermore, since some embodiments are not dependent on a particular feature space, these embodiments are more versatile than prior techniques. The iterative process described herein is particularly effective and outperforms prior techniques in the low-budget regime, and may be solved to global optimality (within a threshold tolerance) via integer programming using any existing integer optimization programming library. Finally, the presently formulated optimization technique not only scales gracefully to handle large data sets, but also includes an optimality guarantee in certain circumstances, given sufficient time to solve.

The present techniques may be applied in various applications. In example deep learning implementations, the present techniques may be used to select training data to improve any machine learning task, such as (e.g., image) classification tasks, (e.g., object) detection, segmentation, and/or others. For example, the present techniques may be used to select images and/or maps of environments for labeling to train various machine learning model(s) to segment and/or classify different objects or components of an environment (e.g., vehicles, cars, trucks, vulnerable road users, pedestrians, cyclists, motorbikes, traffic lights, drivable or other navigable space, sidewalks, buildings, trees, poles, traffic signs, subclasses thereof, some combination thereof, etc.) for use by autonomous vehicles, semi-autonomous vehicles, robots, and/or other object types. In some implementations, the data selection techniques may be applied in other applications besides active learning, such as scenario reduction in stochastic optimization. Potential applications that may leverage the present data selection techniques for scenario reduction include inventory management, supply chain management, facility location problems, and/or other applications.

As such, the techniques described herein may be used to select example data for active learning or other applications. In scenarios where the budget for labeling is limited, it is often desirable that each data point is carefully selected to ensure maximal impact during training. The present techniques address this challenge by formulating an integer optimization problem to select a core set of data (e.g., to label and train a model during cycles of active learning). The present integer optimization problem upper bounds the expected risk, and GBD may be used to directly solve the problem. Formulating the problem as a large mixed-integer linear programming problem may ensure convergence to globally optimal core set selections, in contrast to most selection strategies that approximate global optimality using Greedy (locally optimal) heuristics. The present techniques serve as an improved minimizer of the Wasserstein distance compared to prior heuristics techniques, and outperform or remain competitive with the best performing baselines in active learning, especially when the labeling budget is low.

With reference to FIG. 1, FIG. 1 is a diagram illustrating an example data flow through an example active learning system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The example active learning system 100 may include, among other things, a representation learning component 110 and an active learning pipeline 125, which may include a data selector 130, a labeling oracle 145, and a supervised learning component 155. At a high level, samples from the unlabeled data 105 may be used to train the machine learning model(s) 160 (or a portion thereof), for example, during cycles of active learning. In an example implementation, the representation learning component 110 uses the machine learning model(s) 115 to extract latent representations of the unlabeled data 105 (e.g., unlabeled embeddings 120), and/or the active learning pipeline 125 iteratively selects samples (e.g., selected data points 140) from the unlabeled embeddings 120 (e.g., via integer programming 135 of the data selector 130), associates labels with the selected samples to generate labeled data points 150 (e.g., via the labeling oracle 145), and trains the machine learning model(s) 160 (or a portion thereof) using the labeled data points 150 (e.g., via the supervised learning component 155). The active learning pipeline 125 may iterate over any number of cycles. For example, in each cycle, selected data points 140 may be sampled, removed from the pool of unlabeled embeddings 120, labeled, and/or added to a pool of training data. Accordingly, in each cycle, the pool of training data used to train the machine learning model(s) 160 may grow, and/or the pool of unlabeled embeddings 120 may be reduced. The active learning pipeline 125 may terminate the active learning, for example, upon reaching a designated budget (e.g., a target number of labeled samples used to train the machine learning model(s) 160).

In the implementation illustrated in FIG. 1, there are two (sets of) machine learning models, although in some embodiments, the two models may share one or more components (e.g., a common encoder). At a high level, the machine learning model(s) 115 extracts latent representations of the unlabeled data 105 (e.g., unlabeled embeddings 120), which may be used to select training data for the machine learning model(s) 160. Generally, the machine learning model(s) 160 may perform any type and number of machine learning tasks, such as (e.g., image or text) classification tasks, (e.g., object) detection, segmentation, and/or others, and the unlabeled data 105 may correspond to the particular task (e.g., images for image classification or segmentation tasks, text for language tasks, etc.). Depending on the implementation and/or task to be performed, the unlabeled data 105 may include image data, video data, audio data, text data, numerical data, categorical data, time series data, and/or other types of data.

In some embodiments, the machine learning model(s) 115 and/or the machine learning model(s) 160 may be implemented using a neural network, such as a convolutional neural network (CNN) that includes, without limitation, a feature extractor (e.g., a DNN, an encoder/decoder, etc.) including convolutional layers, pooling layers, and/or other layer types. Generally, the output of one layer may be passed as (one of the) input(s) to the next layer. Although some embodiments may include a neural network, such as CNN, this need not be the case. For example, and without limitation, the machine learning model(s) 115 and/or the machine learning model(s) 160 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In the example active learning system 100 illustrated in FIG. 1, the representation learning component 110 uses the machine learning model(s) 115 to extract the unlabeled embeddings 120 from the unlabeled data 105, the data selector 130 uses the unlabeled embeddings 120 to identify a subset of the unlabeled data 105, the selected data points 140 are labeled, and supervised learning component 155 uses the labeled data points 150 to train the machine learning model(s) 160. In some embodiments, the machine learning model(s) 115 and the machine learning model(s) 160 may share one or more components, such as a feature encoder. For example, in an example implementation involving image data, the machine learning model(s) 115 may include a feature encoder (e.g., ResNet) and a first head (e.g., at least partially discrete stream of layers) comprising a multilayer perceptron (e.g., two layers), and the machine learning model(s) 160 may include the same feature encoder with a second head comprising a different multilayer perceptron (e.g., having one or more different layers).

By way of nonlimiting example, the representation learning component 110 may use any representation learning technique to pre-train, initialize weights, and/or otherwise train the machine learning model(s) 115 to extract the unlabeled embeddings 120. Generally, any representation learning technique may be applied. In some embodiments, self-supervised learning is used to pre-train the machine learning model(s) 115 to extract the unlabeled embeddings 120. By way of nonlimiting example, a self-supervised method such as SimCLR may be used to train the machine learning model(s) 115 (e.g., a feature encoder connected to a head) and extract the unlabeled embeddings 120 using the model. The data selector 130 may use the unlabeled embeddings 120 to sample the selected data points 140, the labeling oracle 145 may obtain labels to generate the labeled data points 150, and the supervised learning component 155 may use any supervised learning technique to train the machine learning model(s) 160 on the labeled data points 150 (e.g., freezing pre-trained encoder weights).

At a high level, active learning pipeline 125 trains the machine learning model(s) 160 using data points selected from the unlabeled embeddings 120. Consider a C-class classification problem over features $x \in X$ and labels $y \in Y := \{1, \ldots, C\}$, where $(X, \|\cdot\|)$ and $(Y, \|\cdot\|)$ are metric spaces. Given a data distribution of unlabeled embeddings 120 and a desired training loss function $l(x, y, w): X \times Y \rightarrow \mathbb{R}$ for training the machine learning model(s) 160, where l is parametrized by weights w of the machine learning model(s) 160, active learning pipeline 125 may attempt to minimize the expected loss (also called the expected risk) $\min_w \mathbb{E}[l(x, y, w)]$. Ideally, a labeled data set $$\{(x_i, y_i)\}_{i=1}^{N}$$

of N samples may minimize the empirical risk. By contrast, in active learning, there may be features $$D = \{x_i\}_{i=1}^{N}$$

(e.g., unlabeled embeddings 120) and a labeling oracle 145 ($\Omega$: $X \rightarrow Y$), where the labeling oracle 145 obtains (e.g., from human labelers) or generates (e.g., automatically) corresponding labels. Let $\pi \in \{0,1\}^N$ represent a selection of data points to label given a budget B. That is, the labeling oracle 145 may be called B times to create a labeled core set $$C(\pi) := \{x_j, \Omega(x_j)\}_{j=1}^{B}$$

where $x_i \in C(\pi)$ is labeled if an only if $\pi_i = 1$. Active learning pipeline 125 may attempt to optimize C(n).

The expected risk may be bound by a generalization error corresponding to training with an unlimited number of oracle calls, the empirical risk of training with a core set of B data points, and a core set loss of the difference between training with all data points versus only the core set. An example bound may given as:

$$\mathbb{E}[\ell(x, y; w)] \le \underbrace{\frac{1}{B}\sum_{j=1}^{B}\ell(x_j, \Omega(x_j); w)}_{\text{empirical risk}} + \underbrace{\mathbb{E}[\ell(x, y; w)] - \frac{1}{N}\sum_{i=1}^{N}\ell(x_i, \Omega(x_i); w)}_{\text{generalization bound}} + \underbrace{\frac{1}{N}\sum_{i=1}^{N}\ell(x_i, \Omega(x_i); w) - \frac{1}{B}\sum_{j=1}^{B}\ell(x_j, \Omega(x_j); w)}_{\text{core set loss}}.$$

Note that the generalization bound does not depend on the core set. Furthermore, for small B, the empirical risk is negligibly small. Thus, the active learning pipeline 125 may focus on an active learning strategy that specifically minimizes the core set loss.

$$D_x = [\|x_i - x_{i'}\|]_{i=1,i'=1}^{N,N} \tag{1}$$

$$W(C(\pi), \mathcal{D}) := \min_{\Gamma \ge 0}\left\{\langle D_x, \Gamma\rangle \mid \Gamma 1 = \frac{1}{N}1, \Gamma^\top 1 = \frac{1}{B}\pi\right\}$$

$$= \max_{\lambda,\mu}\left\{\frac{1}{N}\mu^\top 1 - \frac{1}{B}\lambda^\top \pi \;\middle|\; \lambda^\top \otimes 1 + \mu \otimes 1^\top \le D_x\right\} \tag{2}$$

where F is the transport matrix that controls the movement of mass from set C to set D, λ, and λ are dual variables that represent an equivalent form of Γ, and <A, B>=Trace($A^T B$) is the Frobenius inner product between real matrices A and B. As such, an active learning strategy may be formulated as the following optimization Problem (3):

$$\min_{\pi \in \{0,1\}^N} W(C(\pi), \mathcal{D}) \text{ s.t. } |C(\pi)| = B. \tag{3}$$

Since the Wasserstein distance minimizes a transport between distributions, it may lead to better coverage of the unlabeled set (e.g., unlabeled embeddings 120) over other techniques. Furthermore, the discrete Wasserstein distance may be computed by a linear program, meaning that this active learning strategy may be written as a mixed integer linear program (MILP) (e.g., integer programming 135). Finally, the Wasserstein distance induces a new bound on the expected risk in training. Specifically, the Wasserstein distance directly upper bounds the core set loss under the assumption of a Lipschitz loss function. Since the loss function l may be chosen by design, in some embodiments, the loss function may be chosen so this assumption holds.

$$D_y = [|\Omega(x_i) - \Omega(x_i')|]_{i=1,i'=1}^{N,N}$$

$$\frac{1}{N}\sum_{i=1}^{N}\ell(x_i, \Omega(x_i); w) - \frac{1}{B}\sum_{j=1}^{B}\ell(x_j, \Omega(x_j); w) \le$$

$$\sup_{\tilde{\ell} \in \mathcal{L}_K}\left\{\frac{1}{N}\sum_{i=1}^{N}\tilde{\ell}(x_i, \Omega(x_i); w) - \frac{1}{B}\sum_{i'=1}^{N}\pi_i, \tilde{\ell}(x_{i'}); w\right\}\Bigg\} =$$

$$\begin{cases}\max_{\lambda,\mu} & \frac{1}{N}\mu^\top 1 - \frac{1}{B}\lambda^\top \pi \\ \text{s.t.} & \lambda^\top \otimes 1 + \mu \otimes 1^\top \le K(D_x + D_y)\end{cases} = \begin{cases}\min_{\Gamma \ge 0} & K((D_x + \varepsilon D_y), \Gamma) \\ \text{s.t.} & \Gamma 1 = \frac{1}{N}1 \\ & \Gamma^\top 1 = \frac{1}{B}\pi\end{cases}.$$

The first line introduces probability masses and upper bounds the objective with a supremum over all K-Lipschitz functions $\tilde{l} \in L_K$. The second line replaces $\tilde{l}$ with vectors μ and λ that satisfy the Lipschitz property. The final line takes the dual of the linear program.

Next note that $|\Omega(x_i) - \Omega(x_{i'})| \le C$, meaning that for any feasible Γ to the Wasserstein problem, the following inequality will apply:

$$\langle D_y, \Gamma\rangle = \sum_{i=1}^{N}\sum_{i'=1}^{N}|\Omega(x_i) - \Omega(x_{i'})|\Gamma_{i,i'} \leq C\sum_{i=1}^{N}\sum_{i'=1}^{N}\Gamma_{i,i'} = C$$

The last equality follows from the constraints in the Wasserstein distance primal program implying $1^T\Gamma 1=1$. As such, the objective of the linear program may be written as:

$$K(D_x + \varepsilon D_y, \Gamma) = K((D_x, \Gamma) + \varepsilon(D_y, \Gamma)) \leq K(D_x, \Gamma) + KC_\varepsilon.$$

Since the second term does not depend on Γ, it may be removed from the optimization objective, and the proof is complete.

In some embodiments, the active learning pipeline 125 (e.g., integer programming 135 of data selector 130) may solve problem (3) (i.e., select a core set C that minimizes Wasserstein distance between C and D) using a Generalized Benders Decomposition (GBD), an iterative framework for large-scale non-convex constrained optimization. Using this technique to decompose and iteratively minimize Wasserstein distance (i) has an intuitive interpretation of iteratively using sub-gradients of the Wasserstein distance as constraints, (ii) significantly reduces the size of the original optimization problem, and (iii) converges to an optimal solution.

Problem (3), which selects an optimal core set, may be re-written as the following MILP problem (4):

$$\min_{\pi\in\{0,1\}^N, \Gamma\geq 0} \langle D_x, \Gamma\rangle \text{ s.t. } \Gamma 1 = \frac{1}{N}1,\ \Gamma^\top 1 = \frac{1}{B}\pi,\ \pi^\top 1 = B \tag{4}$$

Let us define $G:=\{\Gamma\geq 0|\Gamma 1=1/N\}$ and $P:=\{\pi\in\{0, 1\}^N|\pi^T 1=B\}$. Problem (4) is equivalent to the following Wasserstein-Master Problem (W-MP) (5):

$$\min_{\eta,\pi\in\mathcal{P}} \eta \text{ s.t. } \eta \geq \inf_{\Gamma\in\mathcal{G}}\left\{\langle D_x, \Gamma\rangle + \lambda^\top\left(\frac{1}{B}\pi - \Gamma^\top 1\right)\right\},\ \forall\, \lambda \in \mathbb{R}^N \tag{5}$$

where η is a slack variable which when minimized, is equal to the optimal value of problem W-MP (5).

In problem W-MP (5), the dual variable λ may be any value, so problem W-MP (5) contains an infinite number of constraints. However, problem W-MP (5) can also be re-written as a single constraint by replacing the right-hand-side with the Lagrangian L(π) of the inner optimization problem. Furthermore, L(π) is equivalent to the Wasserstein distance:

$$L(\pi) := \sup_{\lambda\in\mathbb{R}^N}\inf_{\Gamma\in\mathcal{G}}\left\{\langle D_x, \Gamma\rangle + \lambda^\top\left(\frac{1}{B}\pi - \Gamma^\top 1\right)\right\} = W(C(\pi), \mathcal{D}).$$

Instead of the semi-infinite problem W-MP (5), the active learning pipeline 125 (e.g., integer programming 135 of data selector 130) may consider a finite set of values λ may take, accumulate those values in $\Lambda\subset\mathbb{R}^N$, and therefore consider a finite set of constraints and iteratively solve a Wasserstein-Relaxed Master Problem (W-RMP(Λ)):

$$\min_{\eta,\pi\in\mathcal{P}} \eta \text{ s.t. } \eta \geq \inf_{\Gamma\in\mathcal{G}}\left\{\langle D_x, \Gamma\rangle + \hat{\lambda}^\top\left(\frac{1}{B}\pi - \Gamma^\top 1\right)\right\},\ \forall\, \hat{\lambda} \in \Lambda.$$

Let $(\hat{\eta}, \hat{\pi})$ be an optimal solution to W-RMP(A) and let $(\eta^*, \pi^*)$ be an optimal solution to W-MP. Since W-RMP is a relaxation, $\hat{\eta}\leq\eta^*$ lower bounds the optimal value to W-MP (and thus also to problem (4)). Furthermore, $L(\hat{\pi})=W(C(\hat{\pi}), D))\geq W(C(\pi^*), D))=\eta^*$ upper bounds the optimal value to W-MP. By iteratively adding new values to A (and therefore new constraints to problem (4)), we can make W-RMP(A) a tighter approximation of W-MP, and consequently tighten the upper and lower bounds. In other words, intelligently selecting Λ will yield tighter relaxations to W-MP. As such, GBD may be used to iteratively grow Λ and solve increasingly larger RMPs until the upper and lower bounds converge (or a designed run-time limit expires).

In an example implementation of GBD, a selection $\hat{\pi}^0\in P$ and $\Lambda=\theta$ may be initialized. Then, for each iteration $t\in\{0, 1,2, \ldots\}$, (i) given a current solution $(\hat{\eta}^t, \hat{\pi}^t)$ solve the Lagrangian $L(\hat{\pi}^t)$ (which is equivalent to determining the Wasserstein distance) to determine a dual variable $\hat{\lambda}^t$ and a primal-dual transport $(\hat{\Gamma}^t, \hat{\lambda}^t)$, and (ii) update $\Lambda\leftarrow\Lambda\cup\{Xt\}$ and solve W-RMP(A) to obtain a subsequent solution $(\hat{\eta}^{t+1}, \hat{\pi}^{t+1})$. The dual variables of the Wasserstein equality constraints are sub-gradients of problem (4). In each iteration, this procedure computes $W(C(\pi),D)$ and adds a new constraint to W-RMP(A). Intuitively, each constraint is a new lower bound on η using the sub-gradient with respect to $\hat{\pi}$. The GBD may continue iterating, and terminate, for example, based on a determination that $W(C(\hat{\pi}^t), D)-\hat{\eta}^t$ is less than a designated tolerance ε, that a designated runtime limit (e.g., 3-6 hours) has expired, and/or otherwise.

This GBD procedure should always converge in a finite number of iterations. The original problem (4) contains $N^2+N$ variables and 2N+1 constraints where $N=|D|$, making it intractable for most deep learning data sets (e.g., N=50, 000 for CIFAR-10). By contrast, W-RMP(A) only contains N+1 variables and |Λ|constraints (i.e., the number of constraints equals the number of iterations). In an example implementation that runs for 500 iterations, W-RMP(Λ) is orders of magnitude smaller than problem (4). Finally, because the objectives and constraints of W-MP are linear and separable in Γ and π, GBD converges to an optimal solution within a threshold tolerance in finite time.

In some embodiments, the GBD procedure may be accelerated by imposing one or more constraints on W-RMP(Λ) that tighten the relaxation of W-MP. More specifically, one or more optimality cuts and/or pruning constraints may be imposed on W-RMP(Λ).

A given inequality may be referred to as an optimality cut for an optimization problem if the optimal solution is guaranteed to satisfy the inequality. As such, introducing optimality cuts as additional constraints to an optimization problem will not change the optimal solution, but it may lead to a smaller feasible set. As such, W-RMP(Λ) may be augmented with one or more optimality cuts (e.g., in addition to the Lagrangian constraints) at each iteration of the GBD. For all $\pi\in P$, let $(\hat{\Gamma}, \hat{\lambda}, \hat{\mu})$ be optimal primal-dual solutions to $W(C(\hat{\pi}), D))$ in problems (1) and (2). Furthermore, let $D_{i,i'}$ be elements of $D_x$. As such, one or more of the following inequalities (6)-(8) may be imposed as optimality cuts:

$$\text{Lower Bound: } \eta \geq \frac{1}{B}\sum_{i=1}^{N} \min_{i' \in \{1, \ldots, N\}} \{D_{i,i'} \mid D_{i,i'} > 0\} \pi_i \tag{6}$$

$$\text{Triangle Inequality: } \eta \geq \frac{1}{B}\sum_{i=1}^{N} \min_{\substack{i' \in \{1, \ldots, N\} \\ x_{i'} \in C(\pi)}} \{D_{i,i'} \mid D_{i,i'} > 0\} \pi_i - W(C(\hat{\pi}), \mathcal{D}) \tag{7}$$

$$\text{Dual Inequality: } \eta \geq W(C(\hat{\pi}), \mathcal{D}) + \frac{1}{B}\hat{\lambda}^{\top}\pi - \frac{1}{N}\hat{\mu}^{\top}1 - \frac{1}{B}\sum_{i=1}^{N} \max_{i' \in \{1, \ldots, N\}} \{D_{i,i'}\} \pi_i \tag{8}$$

Inequality (6) is derived from a lower bound on the Wasserstein distance between two probability distributions. This is a general relationship between η and π, and may be included as an additional constraint to W-RMP(Λ), for example, at the onset of the GBD procedure. Inequalities (7) and (8) bound η and π with respect to a given ft. As such, in some embodiments, in each iteration, when the GPD procedure obtains a new it, a Triangle and/or Dual Inequality may be obtained and added as a constraint to W-RMP(Λ) (e.g., along with the Lagrangian constraints). An optimal solution to W-MP satisfies the inequalities (6)-(8), meaning that including them as additional constraints to W-RMP(Λ) will still ensure that the optimal solution to W-MP is feasible for W-RMP(Λ) for any Λ (and therefore is also optimal once Λ is sufficiently large). That is, convergence may be preserved, while tightening the relaxation, which reduces the search space of candidate data points and consequently, the overall number of iterations of the GBD procedure.

In some embodiments, one or more pruning constraints may additionally or alternatively be imposed. In some cases, augmenting W-RMP(Λ) with constraints that are not valid optimality cuts may potentially remove the global optimal solution of W-MP from the relaxed problem. Nonetheless, such constraints may empirically improve the procedure by removing unnecessary regions of the relaxed feasible set. For example, one or more pruning constraints may be applied to remove search neighborhoods around candidate core sets with high Wasserstein distances and encourage searching near neighborhoods of candidate data points around candidate core sets with lower Wasserstein distances.

More specifically, Let $P^+$ and $P^-$ denote two sets of good and bad candidate core sets $\hat{\pi}$, respectively, and let $\beta^+$, $\beta^- \in (0, 1)$ denote two hyperparameters. In some embodiments, in each iteration, a candidate $\hat{\pi}$ and a corresponding upper bound $W(C(\hat{\pi}), D))$ to the W-MP may be determined. If this upper bound is a new incumbent (i.e., is lower than the previous upper bounds), then $P^+ \cup \{\hat{\pi}\}$ may be updated and the search may be limited to within a Hamming ball of size $\beta^+ B$ around $\hat{\pi}$. Otherwise, $P^- \cup \{\hat{\pi}\}$ may be updated and a Hamming ball of size $\beta^- B$ around $\hat{\pi}$ may be removed from the search space. These two pruning techniques may be described by the following linear constraints: $\forall \hat{\pi} \in P^+$, $\pi^T\hat{\pi} \geq \beta^+ B$ and $\forall \hat{\pi} \in P^-$, $\pi^T\hat{\pi} \leq \beta^- B$.

An example implementation using GBD to minimize Wasserstein Distance is illustrated below in Algorithm 1. This example runs in a loop by iteratively solving our optimization problem and adding new constraints, and may be implemented using a Wasserstein Algorithm 1 Generalized Benders Decomposition (GBD) for the Minimum Wasserstein Distance Input: budget B; initial core set $\hat{\pi}$; constraint sets $\Lambda = \emptyset$, $P^+ = \{\hat{\pi}\}$, $P^- = \emptyset$; upper bound $\overline{B} = \infty$; lower bound $\underline{B} = -\infty$; hyperparameters $\beta^+$, $\beta^-$; tolerance ε; maximum time limit T
repeat
    Solve $W(C(\hat{\pi}), D)$: $\hat{\Gamma} \leftarrow \arg\min$ Problem (1), $(\hat{\lambda}, \hat{\mu}) \leftarrow \arg\max$ Problem (2).
    $\Lambda \leftarrow \Lambda \cup \{(\hat{\pi}, \hat{\Gamma}, \hat{\lambda}, \hat{\mu})\}$ // Update GBD constraint set
    if $W(C(\hat{\pi}), D) \leq \overline{B}$ then
        $\overline{B} \leftarrow \min(\overline{B}, W(C(\hat{\pi}), D))$ // Update upper bound on optimal value
        $P^+ \leftarrow P^+ \cup \{\hat{\pi}\}$ // Update Near Neighbourhood set
    else
        $P^- \leftarrow P^- \cup \{\hat{\pi}\}$ // Update Prune Neighbourhood set
    end if
    Solve W-RMP(Λ):

$$(\hat{\eta}, \hat{\pi}) \leftarrow \arg\min_{\eta, \pi \in P} \eta$$

$$\text{s.t. } \eta \geq \frac{1}{B}\hat{\lambda}^T\left(\pi - \frac{1}{B}\hat{\Gamma}^T 1\right) + W(C(\hat{\pi}), D), \qquad \forall (\hat{\pi}, \hat{\Gamma}, \hat{\lambda}, \hat{\mu}) \in \Lambda$$

Figure 2:
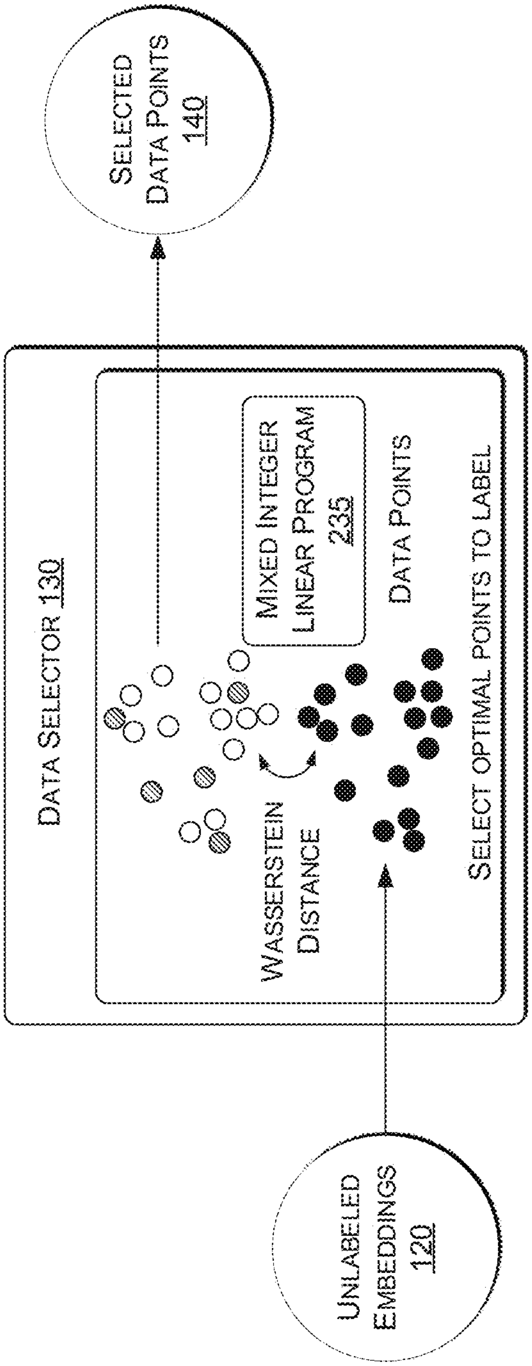
FIG. 2 is a block diagram of an example data selector, in accordance with some embodiments of the present disclosure.

Lower Bound, Eq. (6)
Triangle Ineq., Eq. (7), $\forall(\hat{\pi}, \hat{\Gamma}, \hat{\lambda}, \hat{\mu}) \in \Lambda$
Dual Ineq., Eq. (8), $\forall(\hat{\pi}, \hat{\Gamma}, \hat{\lambda}, \hat{\mu}) \in \Lambda$
$\pi^T\hat{\pi} \geq \beta^+ B$, $\forall\hat{\pi} \in P^+$
$\pi^T\hat{\pi} \leq \beta^- B$, $\forall\hat{\pi} \in P^-$ $\underline{B} \leftarrow \max(\underline{B}, \hat{\eta})$ // Update lower bound on optimal value
until T hours or $\overline{B} - \underline{B} < \varepsilon$ // Exit at timeout or convergence As such, the integer programming 135 of the data selector 130 may execute a decomposition and iterative solving procedure to select a set of the unlabeled embeddings 120 and identify the corresponding selected data points 140 (e.g., corresponding images). FIG. 2 is a block diagram of an example data selector 130, in accordance with some embodiments of the present disclosure. In an example implementation, data selector 130 accesses unlabeled embeddings 120, and uses GBD to identify the selected data points 140 by decomposing and iteratively solving the mixed integer linear program 235 to minimize the Wasserstein distance between the two sets of data represented by the selected data points 140 and the unlabeled embeddings 120.

Figure 3:
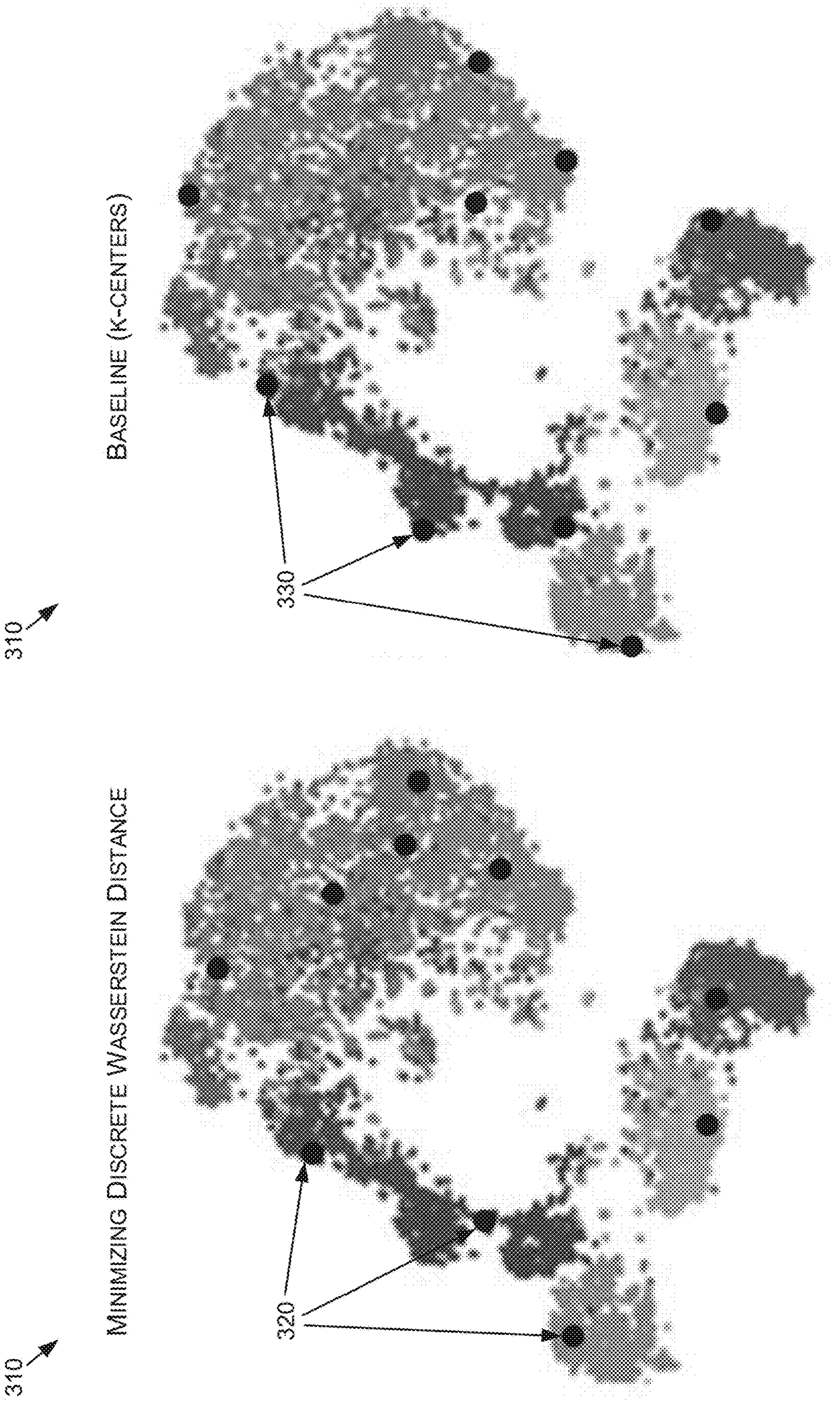
FIG. 3 illustrates visualizations of an example feature space of an example data set and data points selected from the data set, in accordance with some embodiments of the present disclosure.

Iteratively solving a decomposition of the mixed integer linear program 235 serves to select a set of data points that matches the distribution of the data set they are selected from. By way of illustration, FIG. 3 provides visualizations of an example feature space of an example data set. More specifically, a feature space 310 of an example data set is represented with a t-distributed stochastic neighbor embedding (t-SNE) plot. Selected points 320 using the present technique and selected points 330 using a prior technique (k-centers) are illustrated where their corresponding embeddings are located in the feature space 310. Note that the selected points 320 using the present technique provide better coverage of the entire latent space by selecting points closer to cluster centers and covering most clusters. On the other hand, selected points 330 using the prior technique leave large holes in certain regions of the latent space.

Returning to the example active learning system 100 in FIG. 1, the labeling oracle 145 may obtain and associate labels, annotations, and/or other representations of ground truth with the selected data points 140 to generate the labeled data points 150. Generally, each of the selected data points 140 (e.g., an image) may be annotated (e.g., manually, automatically, etc.) or otherwise associated with a label(s) or other ground truth value(s). By way of nonlimiting example, in the cases of image annotations, labels may be generated within a drawing program (e.g., an annotation program), computer aided design (CAD) program, labeling program, another type of suitable program, and/or may be hand drawn, in some examples. In any example, the labels may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, identifies ground truth values or the location of label), and/or a combination thereof (e.g., human identifies vertices of polylines, machine generates polygons using polygon rasterizer). In the case of image data, labels may comprise bounding boxes, closed polylines, or other bounding shapes drawn, annotated, superimposed, and/or otherwise associated with image data.

Thus, the selected data points 140 (or an embedding thereof) and corresponding ground truth data may be included in a pool of training data, and the supervised learning component 155 may use the pool of training data to update the machine learning model(s) 160 during training. During training (e.g., the representation learning component 110 training the machine learning model(s) 115 and/or the supervised learning component 155 training the machine learning model(s) 160), one or more loss functions (e.g., a single loss function, a loss function for each output type, etc.) may be used to compare the accuracy of the output(s) of the machine learning model to ground truth, and the parameters of the machine learning model (or a portion thereof) may be updated (e.g., using backward passes, backpropagation, forward passes, etc.) until a target number of training samples has been used, until the model accuracy reaches an optimal or acceptable level, and/or otherwise.

Although some embodiments that involve training a machine learning model(s) are described in the context of active learning, this need not be the case, as some implementations may select a single set of training data for labeling and downstream learning.

Furthermore, in some embodiments, the data selection techniques described herein may be used to solve a stochastic optimization problem. Consider a general stochastic optimization problem $$\min_{w \in \mathcal{W}} \mathbb{E}_{x \sim \mathbb{P}}[f(x, w)]$$

where f (x, w) is an objective function, w∈W is the variable to optimize, and x~ℙ is a random variable, here referred to as a scenario. Given a data set $$D := \{(\hat{x}_i)\}_{i=1}^{N}$$

of N scenarios, a Sample Average Approximation (SAA) may be solved, which amounts to minimizing the empirical expected value. Machine learning is a special case of the above problem where f (x, w) corresponds to the loss function, w to neural network weights, and x to training data.

The SAA may grow difficult to solve with large data sets, especially if W is non-convex or contains integral constraints. Here, scenario reduction is the problem of formulating an approximation of the SAA by using only a subset $$C := \{(\hat{x}_j)\}_{j=1}^{B} \subset D$$

of B scenarios. As such, this subset may be constructed by minimizing the Wasserstein distance between C and D, i.e., by solving problem (4) using GBD. As such, the present data selection techniques may be used to select a subset of scenarios in various scenario reduction applications.

Figure 4:
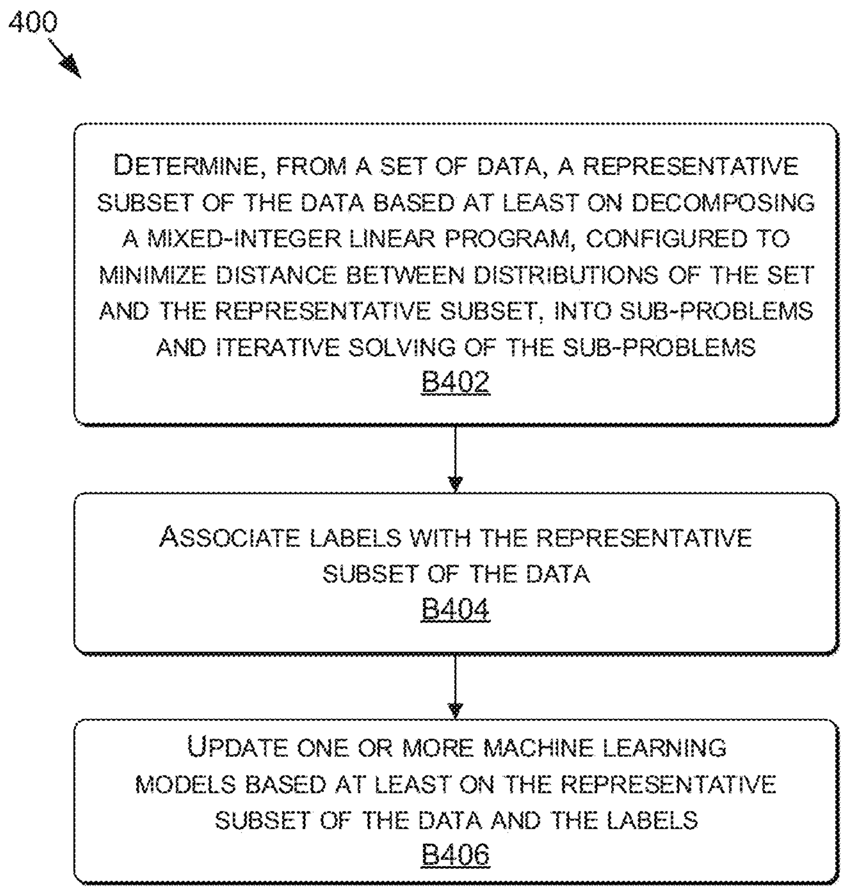
FIG. 4 is a flow diagram showing a method for updating one or more machine learning models based at least on a representative subset of data, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the system of FIG. 1. However, this method may additionally or alternatively be executed by any one system, or any combination of systems, including, but not limited to, those described herein.

FIG. 4 is a flow diagram showing a method 400 for updating one or more machine learning models based at least on a representative subset of data, in accordance with some embodiments of the present disclosure. The method 400, at block B402, includes determining, from a set of data, a representative subset of the data based at least on decomposing a mixed-integer linear program, configured to minimize distance between distributions of the set and the representative subset, into sub-problems and iterative solving of the sub-problems. For example, with respect to FIG. 1, the data selector 130 may access unlabeled embeddings 120 and solve problem (3) to select a core set of data points C that minimizes the Wasserstein distance between C and D using a Generalized Benders Decomposition (GBD).

The method 400, at block B404, includes associating labels with the representative subset of the data. For example, with respect to FIG. 1, the labeling oracle 145 may obtain labels for the selected data points 140 from human labelers or via machine-automated process. The labeling oracle 145 may associate each label with its corresponding data point from the selected data points 140.

The method 400, at block B406, includes updating one or more machine learning models based at least on the representative subset of the data and the labels. For example, with respect to FIG. 1, the supervised learning component 155 may train the machine learning model(s) 160 using the selected data points 140 as input data and the received labels as ground truth. In some embodiments, the method 400 may be repeated, for example, over multiple cycles of active learning.

Figure 5:
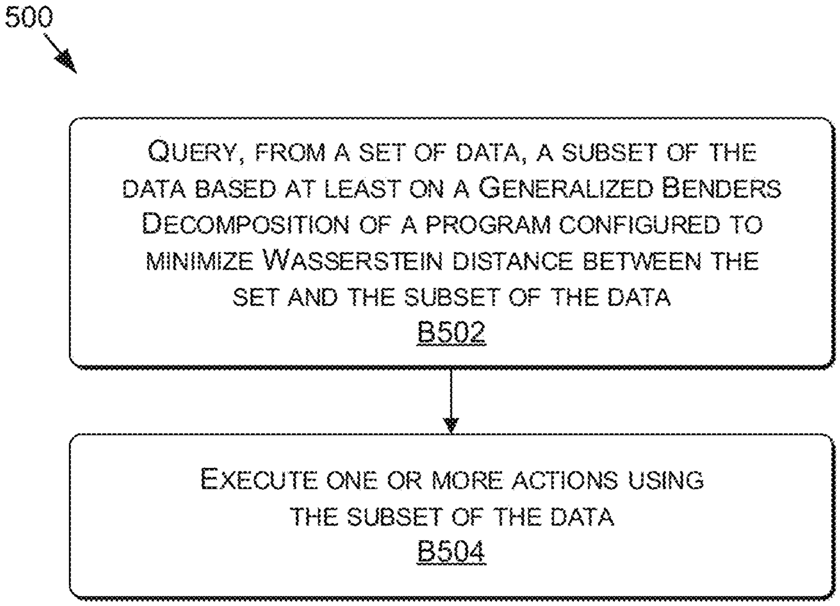
FIG. 5 is a flow diagram showing a method for querying a subset of data based at least on a Generalized Benders Decomposition, in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 500 is described, by way of example, with respect to the system of FIG. 1. However, this method may additionally or alternatively be executed by any one system, or any combination of systems, including, but not limited to, those described herein.

FIG. 5 is a flow diagram showing a method 500 for querying a subset of data based at least on a Generalized Benders Decomposition, in accordance with some embodiments of the present disclosure. The method 500, at block B502, includes querying, from a set of data, a subset of the data based at least on a Generalized Benders Decomposition of a program configured to minimize Wasserstein distance between the set and the subset of the data. For example, with respect to FIG. 1, the data selector 130 may access unlabeled embeddings 120 and solve problem (3) to select a core set of data points C that minimizes the Wasserstein distance between C and D using a Generalized Benders Decomposition (GBD).

The method 500, at block B504, includes executing one or more actions using the subset of the data. For example, with respect to FIG. 1, the labeling oracle 145 may obtain labels for the selected data points 140 and associate each label with its corresponding data point from the selected data points 140, and the supervised learning component 155 may train the machine learning model(s) 160 using the selected data points 140 as input data and the received labels as ground truth.

Figure 6:
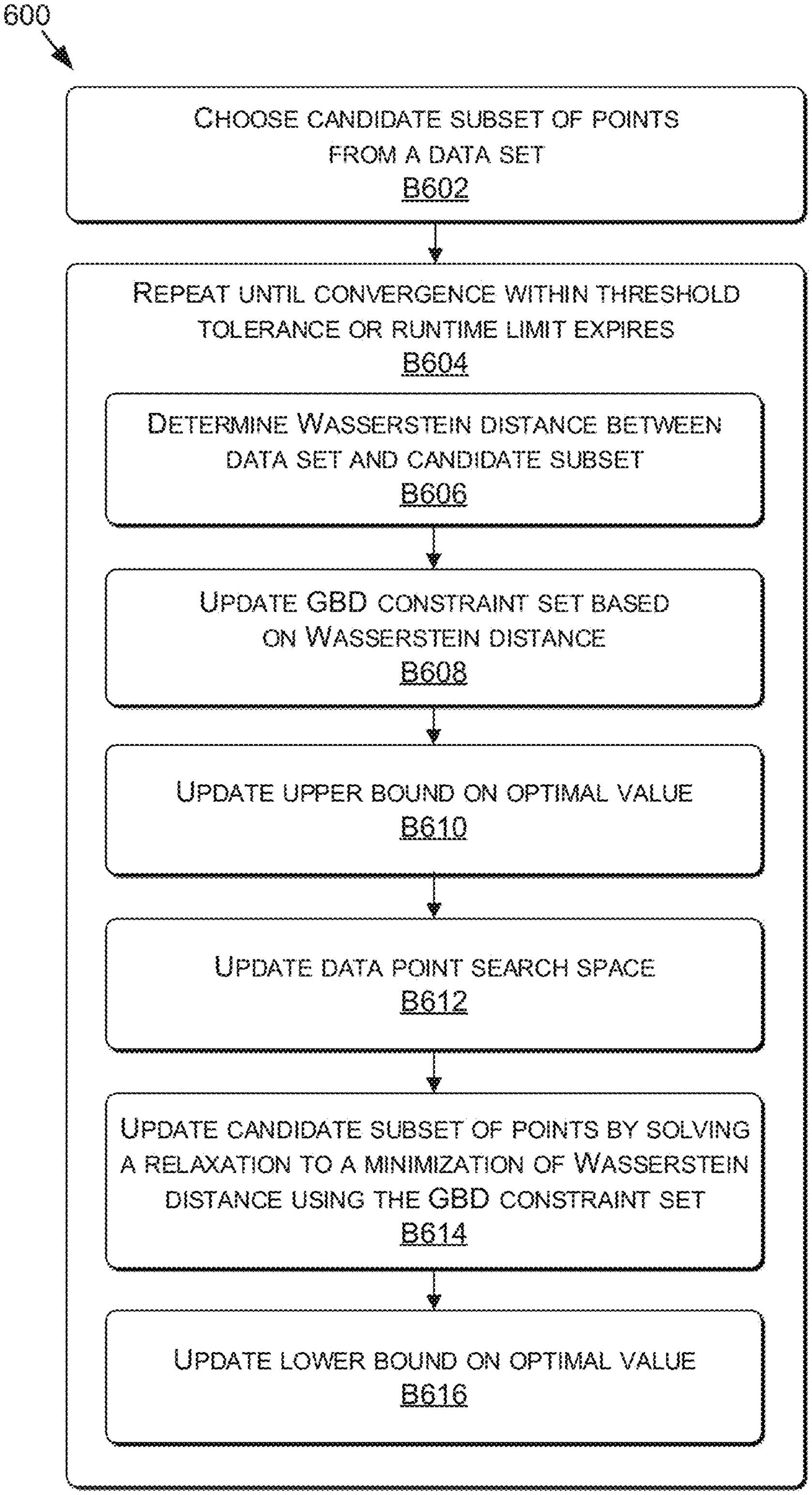
FIG. 6 is a flow diagram showing a method for selecting a subset of points from a data set by solving a relaxation to a minimization of Wasserstein distance, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 600 is described, by way of example, with respect to the system of FIG. 1. However, this method may additionally or alternatively be executed by any one system, or any combination of systems, including, but not limited to, those described herein.

FIG. 6 is a flow diagram showing a method 600 for selecting a subset of points from a data set by solving a relaxation to a minimization of Wasserstein distance, in accordance with some embodiments of the present disclosure. In an example implementation, the method 600 may be performed by the data selector 130 of FIG. 1 and/or of FIG. 2.

The method 600, at block B602, includes choosing a candidate subset of points from a data set. For example, some initial candidate set of data points may be initialized using any known technique (e.g., randomly, using some clustering technique, etc.).

The method 600, at block B604, repeats blocks B606-B616 until a convergence event occurs within some designated threshold tolerance or a designated runtime limit expires. For example, upper and lower bounds on an optimal solution $\hat{\eta}$ to W-RMP(Λ) may be initialized (e.g., as in Algorithm 1), and as blocks B606-B616 iterate, the bounds may be tightened (e.g., at blocks B610 and B616), and convergence may be measured based on the difference between the upper and lower bound.

The method 600, at block B608, includes updating a GBD constraint set Λ based on the Wasserstein distance. More specifically, the Wasserstein distance computed in block B606 yields a corresponding value of the dual variable $\hat{\lambda}^t$, which may be included in the GBD constraint set Λ.

The method 600, at block B610, includes updating upper bound on optimal value. For example, if the Wasserstein distance computed in block B606 is less than or equal to upper bound on optimal value, the Wasserstein distance may be used as the new upper bound.

In some embodiments, the method 600, at block B612, includes updating the data point search space. For example, if the Wasserstein distance computed in block B606 is less than or equal to upper bound on optimal value, then (e.g., a neighborhood surrounding) the current candidate subset of data points may be added to a set of good points (e.g., a near neighborhood set). Otherwise, (e.g., a neighborhood surrounding) the current candidate subset of data points may be added to a set of bad points (e.g., a prune neighborhood set).

The method 600, at block B614, includes updating candidate subset of points by solving a relaxation to a minimization of Wasserstein distance using the GBD constraint set. For example, W-RMP(Λ) may be solved using a MILP solver, optionally imposing one or more optimality and/or pruning cuts. For example, when updating candidate subset of points, the search space may be limited by excluding data points in the prune neighborhood set.

The method 600, at block B616, includes updating the lower bound on optimal value. For example, solving W-RMP(Λ) at block B614 may yield an updated solution $\hat{\eta}$. If the updated solution is greater than the lower bound on the optimal value, the updated solution may be used as the new lower bound.

As such, and as represented by block B604, blocks B606-B616 may repeat until convergence occurs within some designated threshold tolerance or a designated runtime limit expires.

The systems and methods described herein may be used for a variety of purposes, by way of example and without limitation for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Computing Device

Figure 7:
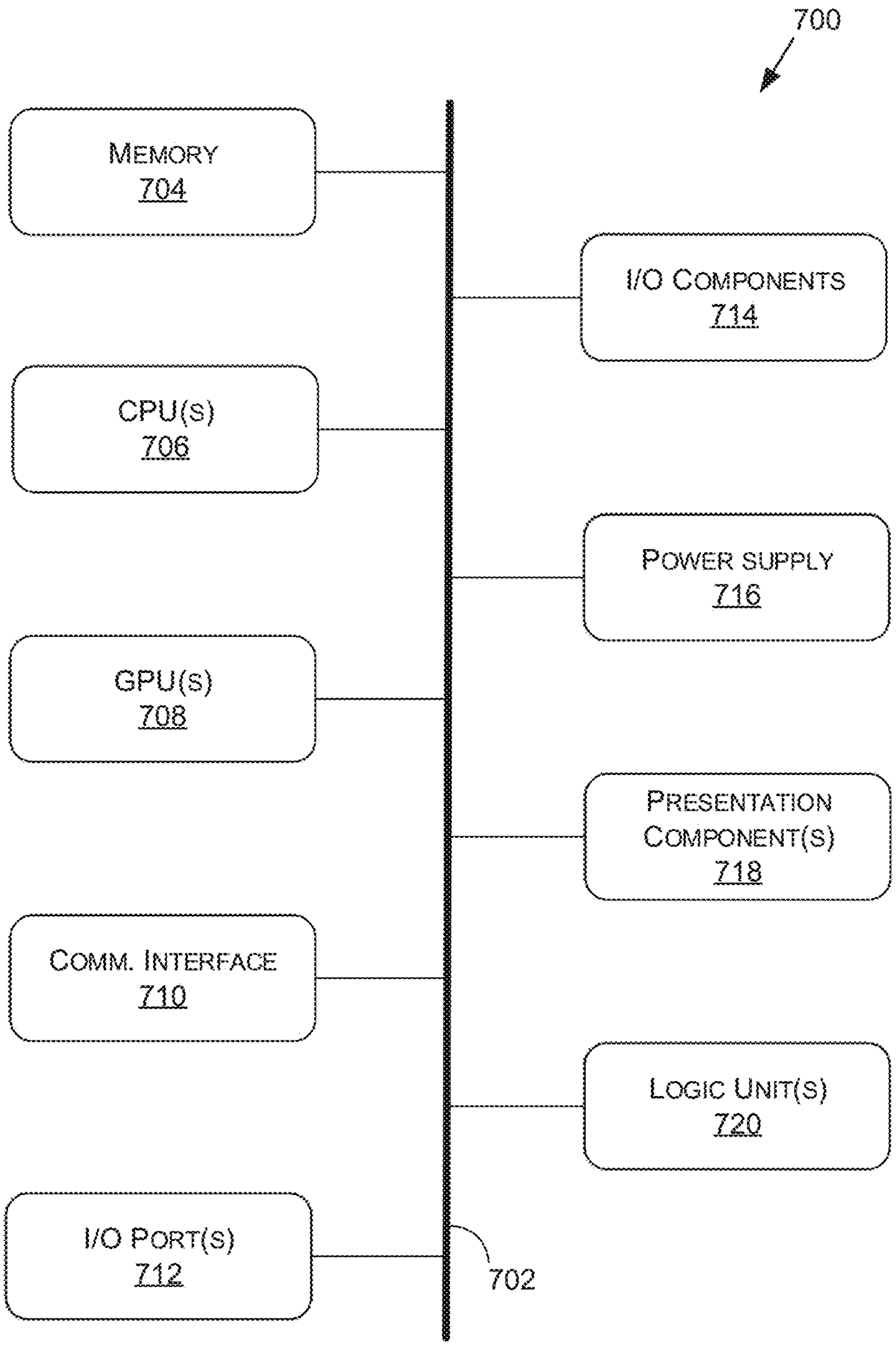
FIG. 7 is a block diagram of an example computing device suitable for use in implementing some embodiments of the present disclosure.

FIG. 7 is a block diagram of an example computing device(s) 700 suitable for use in implementing some embodiments of the present disclosure. For example, the active learning system 100 of FIG. 1 may be implemented and execute on one or more computing devices, such as the computing device 700. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720. In at least one embodiment, the computing device(s) 700 may comprise one or more virtual machines (VMs), and/or any of the components thereof may comprise virtual components (e.g., virtual hardware components). For non-limiting examples, one or more of the GPUs 708 may comprise one or more vGPUs, one or more of the CPUs 706 may comprise one or more vCPUs, and/or one or more of the logic units 720 may comprise one or more virtual logic units. As such, a computing device(s) 700 may include discrete components (e.g., a full GPU dedicated to the computing device 700), virtual components (e.g., a portion of a GPU dedicated to the computing device 700), or a combination thereof.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 720 and/or communication interface 710 may include one or more data processing units (DPUs) to transmit data received over a network and/or through interconnect system 702 directly to (e.g., a memory of) one or more GPU(s) 708.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, DPUs, etc.), and output the data (e.g., as an image, video, sound, etc.).

Example Data Center

Figure 8:
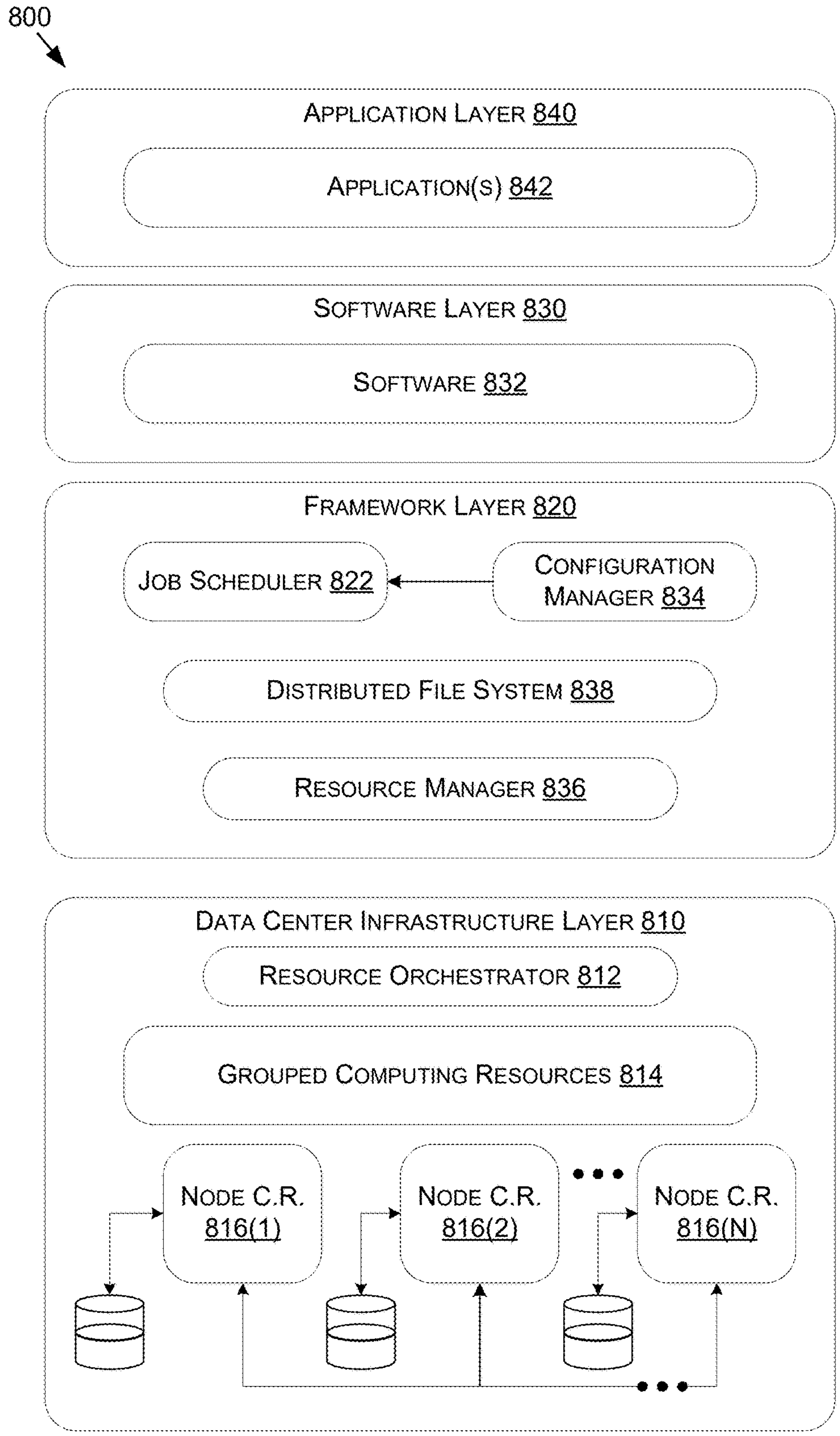
FIG. 8 is a block diagram of an example data center suitable for use in implementing some embodiments of the present disclosure.

FIG. 8 illustrates an example data center 800 that may be used in at least one embodiments of the present disclosure. For example, the active learning system 100 of FIG. 1 may be implemented and execute one or more computing devices (e.g., the computing device 700) in the data center 800. The data center 800 may include a data center infrastructure layer 810, a framework layer 820, a software layer 830, and/or an application layer 840.

As shown in FIG. 8, the data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 816(1)-816(N) may correspond to a server having one or more of the above-mentioned computing resources. In addition, in some embodiments, the node C.R.s 816(1)-8161(N) may include one or more virtual components, such as vGPUs, vCPUs, and/or the like, and/or one or more of the node C.R.s 816(1)-816(N) may correspond to a virtual machine (VM).

In at least one embodiment, grouped computing resources 814 may include separate groupings of node C.R.s 816 housed within one or more racks (not shown), or many racks housed in data centers at various geographical locations (also not shown). Separate groupings of node C.R.s 816 within grouped computing resources 814 may include grouped compute, network, memory or storage resources that may be configured or allocated to support one or more workloads. In at least one embodiment, several node C.R.s 816 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 812 may configure or otherwise control one or more node C.R.s 816(1)-816(N) and/or grouped computing resources 814. In at least one embodiment, resource orchestrator 812 may include a software design infrastructure (SDI) management entity for the data center 800. The resource orchestrator 812 may include hardware, software, or some combination thereof.

In at least one embodiment, as shown in FIG. 8, framework layer 820 may include a job scheduler 822, a configuration manager 834, a resource manager 836, and/or a distributed file system 838. The framework layer 820 may include a framework to support software 832 of software layer 830 and/or one or more application(s) 842 of application layer 840. The software 832 or application(s) 842 may respectively include web-based service software or applications, such as those provided by Amazon Web Services, Google Cloud and Microsoft Azure. The framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 822 may include a Spark driver to facilitate scheduling of workloads supported by various layers of data center 800. The configuration manager 834 may be capable of configuring different layers such as software layer 830 and framework layer 820 including Spark and distributed file system 838 for supporting large-scale data processing. The resource manager 836 may be capable of managing clustered or grouped computing resources mapped to or allocated for support of distributed file system 838 and job scheduler 822. In at least one embodiment, clustered or grouped computing resources may include grouped computing resource 814 at data center infrastructure layer 810. The resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. Self-modifying actions may relieve a data center operator of data center 800 from making possibly bad configuration decisions and possibly avoiding underutilized and/or poor performing portions of a data center.

The data center 800 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 800. In at least one embodiment, trained or deployed machine learning models corresponding to one or more neural networks may be used to infer or predict information using resources described above with respect to the data center 800 by using weight parameters calculated through one or more training techniques, such as but not limited to those described herein.

In at least one embodiment, the data center 800 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700. In addition, where backend devices (e.g., servers, NAS, etc.) are implemented, the backend devices may be included as part of a data center 800, an example of which is described in more detail herein with respect to FIG. 8.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method of selecting data for active learning, comprising:

executing program code that solves a mixed-integer linear program that minimizes Wasserstein distance between an unlabeled dataset and a representative subset of the unlabeled dataset based at least on iteratively executing a first computational task that selects a candidate subset of the unlabeled dataset from a search space based at least on one or more constraints and a second computational task that evaluates the Wasserstein distance between the unlabeled dataset and the candidate subset and updates the one or more constraints to exclude one or more neighborhoods of the candidate subset from the search space based at least on the evaluated Wasserstein distance, to optimize and accelerate the subset data selection process;

generating one or more labeled data points based at least on associating one or more labels with the representative subset of the unlabeled dataset; and updating, over one or more iterations, one or more parameters of one or more machine learning models based at least on the one or more labeled data points.

2. The method of claim 1, further comprising terminating the iteratively executing based at least on the evaluated Wasserstein distance between the unlabeled dataset and the candidate subset converging within a threshold tolerance.

3. The method of claim 1, further comprising terminating the iteratively executing based at least on the iteratively executing exceeding a threshold run-time.

4. The method of claim 1, wherein the iteratively executing of the first and second computational tasks further comprises imposing one or more optimality cuts based at least on one or more properties of the evaluated Wasserstein distance.

5. The method of claim 1, further comprising iteratively executing the method during one or more cycles of active learning.

6. The method of claim 1, further comprising updating one or more parameters of one or more first machine learning models to extract corresponding representations of the unlabeled dataset based at least on self-supervised learning, wherein the representative subset of the unlabeled dataset is determined based at least on the corresponding representations.

7. The method of claim 1, wherein the method is performed by at least one of:

a system for performing simulation operations;

a system for performing deep learning operations;

a system implemented using an edge device;

a system implemented using a robot;

a system incorporating one or more virtual machines (VMs);

a system implemented at least partially in a data center;

a system for performing light transport simulation;

a system for performing collaborative content creation for 3D assets;

a system for performing conversational AI operations;

a system for generating synthetic data; or a system implemented at least partially using cloud computing resources.

8. A system of selecting data for active learning, comprising:

one or more processors:

execute program code that iteratively solves a mixed-integer linear program that minimizes Wasserstein distance between an unlabeled dataset and a representative subset selected from the unlabeled dataset based at least on iteratively executing a first computational task that selects a candidate subset of the unlabeled dataset from a search space based at least on one or more constraints and a second computational task that evaluates the Wasserstein distance between the unlabeled dataset and the candidate subset and updates the one or more constraints to exclude one or more neighborhoods of the candidate subset from the search space based at least on the evaluated Wasserstein distance, to optimize and accelerate the subset data selection process;

generate one or more labeled data points associating ground truth labels with the representative subset of the unlabeled dataset; and update, over one or more iterations, one or more parameters of one or more machine learning models based at least on the one or more labeled data points.

9. The system of claim 8, wherein the one or more processors are further to terminate the iteratively executing based at least on the evaluated Wasserstein distance between the unlabeled dataset and the representative subset converging within a threshold tolerance.

10. The system of claim 8, wherein the one or more processors are further to terminate the iteratively executing based at least on the iteratively executing exceeding a threshold run-time.

11. The system of claim 8, wherein the iteratively executing of the first and second computational tasks further comprises imposing one or more optimality cuts based at least on one or more properties of the evaluated Wasserstein distance.

12. The system of claim 8, wherein the one or more processors are further to iteratively execute during cycles of active learning.

13. The system of claim 8, wherein the one or more processors are further to:

update one or more first machine learning models to extract corresponding representations of the unlabeled dataset based at least on self-supervised learning; and select the representative subset based at least on the corresponding representations.

14. The system of claim 8, wherein the system is comprised in at least one of:

a system for performing simulation operations;

a system for performing deep learning operations;

a system implemented using an edge device;

a system implemented using a robot;

a system incorporating one or more virtual machines (VMs);

a system implemented at least partially in a data center;

a system for performing light transport simulation;

a system for performing collaborative content creation for 3D assets;

a system for performing conversational AI operations;

a system for generating synthetic data; or a system implemented at least partially using cloud computing resources.

15. A system of selecting data for active learning, comprising processing circuitry to:

query, from an unlabeled dataset, a representative subset of the unlabeled dataset based at least on executing program code that iteratively solves a mixed-integer linear program that minimizes Wasserstein distance between the unlabeled dataset and the representative subset of the unlabeled dataset based at least on iteratively executing a first computational task that selects a candidate subset of the unlabeled dataset from a search space based at least on one or more constraints and a second computational task that evaluates the Wasserstein distance between the unlabeled dataset and the candidate subset and updates the one or more constraints to exclude one or more neighborhoods of the candidate subset from the search space based at least on the evaluated Wasserstein distance; and update one or more parameters of one or more machine learning models based at least on one or more labeled data points associated with the representative subset of the unlabeled dataset corresponding to executing one or more actions using the representative subset of the unlabeled dataset.

16. The system of claim 15, wherein the processing circuitry is further to terminate the iteratively executing based at least on the evaluated Wasserstein distance converging within a threshold tolerance.

17. The system of claim 15, wherein the processing circuitry is further to terminate the iteratively executing based at least on the iteratively executing exceeding a threshold run-time.

18. The system of claim 15, wherein the system is comprised in at least one of:

a system for performing simulation operations;
a system for performing deep learning operations;
a system implemented using an edge device;
a system implemented using a robot;
a system incorporating one or more virtual machines (VMs);
a system implemented at least partially in a data center;
a system for performing light transport simulation;
a system for performing collaborative content creation for 3D assets;
a system for performing conversational Al operations;
a system for generating synthetic data; or
a system implemented at least partially using cloud computing resources.

* * * * *